United States Patent [19]

Heilmann et al.

[11] Patent Number: 4,611,838

[45] Date of Patent: Sep. 16, 1986

[54] FLUIDTIGHT PIPE JOINT

[75] Inventors: Wolfgang Heilmann, Langenfeld; Friedrich Lenze, Ratingen; Gerhard Missaire, Ruppichteroth; Friedrich Winter, Düsseldorf, all of Fed. Rep. of Germany

[73] Assignee: Mannesmann Aktiengesellschaft, Dusseldorf, Fed. Rep. of Germany

[21] Appl. No.: 469,387

[22] Filed: Feb. 24, 1983

[30] Foreign Application Priority Data

Feb. 27, 1982 [DE] Fed. Rep. of Germany ....... 3207180
Feb. 27, 1982 [DE] Fed. Rep. of Germany ....... 3207181
Feb. 27, 1982 [DE] Fed. Rep. of Germany ....... 3207183

[51] Int. Cl.$^4$ ............................................. F16L 15/00
[52] U.S. Cl. ................................... 285/331; 285/334; 285/334.4
[58] Field of Search ............. 285/333, 334, 331, 334.4

[56] References Cited

U.S. PATENT DOCUMENTS

| | | | |
|---|---|---|---|
| 174,035 | 2/1876 | Vick | 285/331 |
| 279,086 | 6/1883 | Emery | 285/331 |
| 1,233,379 | 7/1917 | McCleary | 285/331 X |
| 1,884,551 | 10/1932 | Boynton | 285/331 X |
| 2,258,066 | 10/1941 | Oyen | 285/334 X |
| 2,893,759 | 7/1959 | Blose | 285/334 |
| 3,870,351 | 3/1975 | Matsuki | 285/334 |

FOREIGN PATENT DOCUMENTS

| | | |
|---|---|---|
| 1906009 | 5/1964 | Fed. Rep. of Germany . |
| 1533619 | 6/1970 | Fed. Rep. of Germany . |
| 1525928 | 1/1971 | Fed. Rep. of Germany . |
| 1360257 | 3/1964 | France . |
| 1489013 | 6/1967 | France . |
| 6781 | of 1907 | United Kingdom ................ 285/331 |

Primary Examiner—Cornelius J. Husar
Assistant Examiner—Eric K. Nicholson
Attorney, Agent, or Firm—Karl F. Ross; Herbert Dubno

[57] ABSTRACT

Two metallic pipes to be sealingly interfitted are respectively provided with a plug-shaped male extremity and a socket-shaped female extremity having mating frustoconical peripheral threads and adjoining unthreaded annular peripheral formations closely contacting each other upon assembly. An annular end face of the male extremity and a confronting annular shoulder of the female extremity, lying in planes transverse to the pipe axis or on frustoconical surfaces of large apex angle converging toward the entrance end of the socket upon assembly, respectively have one or more annular rabbets and ribs centered on the pipe axis with profiles having outer or inner flanks parallel to that axis and closely juxtaposed in the fully assembled position in which the top of each rib abuts the bottom of an associated rabbet.

1 Claim, 12 Drawing Figures

FLUIDTIGHT PIPE JOINT

FIELD OF THE INVENTION

Our present invention relates to a fluidtight joint for metallic tubular member—referred to hereinafter as pipes—that are to be coaxially interfitted with the aid of male helicoidal threads on an outer peripheral surface of a plug-shaped extremity of one pipe and mating female helicoidal threads on an inner peripheral surface of a socket-shaped extremity of the other pipe.

BACKGROUND OF THE INVENTION

Such pipe joints are used, for example, in oil-well tubing to form drill strings composed of a series of pipe sections with threaded male and female extremities at opposite ends. The threaded peripheral surfaces of these extremities are usually of frustoconical shape and terminate in annular lands, namely an end face on the male extremity or plug and an inner shoulder on the female extremity or socket, abutting each other in a final position of assembly. In some instances, unthreaded annular zones in the vicinity of these lands may coact in the fully assembled position to form a tight seal therebetween; usually, the sealing zone on the inner socket surface is substantially frustoconical while the confronting zone on the outer plug surface is either convex or frustoconical.

The joints so formed are subjected to considerable stress, e.g. when used in an oil well in which pipe sections of a length of about six meters are to be assembled into a string several kilometers long. To absorb these stresses, the joint should be formed by direct metal-to-metal contact without the interposition of any more readily deformable sealing member.

According to German printed specification No. 1,533,619, for example, the annular shoulder of the socket has a smooth frustoconical surface converging toward the entrance end of that socket at a large obtuse vertex angle; the annular plug face coacting therewith is of complementary frustoconical configuration. When the two extremities are threadedly interfitted under pressure, the interengagement of these frustoconical surfaces tends to expand the plug face in a radial direction with resulting enhancement of the sealing effect between the confronting peripheral zones. The extent of this expansion, however, is determined by the relative torque applied to the two interfitted pipe sections and depends inter alia on such uncontrollable factors as surface roughness or possible irregularities and the presence of an intervening lubricant film. These considerations also apply to an assembly of the type disclosed in German printed specification No. 1,525,928 in which the shoulder of the socket is subdivided into two concentric annular regions, the outer region being frustoconical with a considerably smaller vertex angle pointing away from the entrance end of the socket. The unthreaded peripheral zone of the inner socket surface immediately adjoining the latter region is separated from the confronting unthreaded zone of the plug by a certain annular clearance into which the material of the plug may penetrate upon the radial expansion of its end face.

OBJECT OF THE INVENTION

The object of our present invention is to provide an improved joint for a pair of such pipes in which, after assembly, the seal formed between the unthreaded peripheral zones of the two interfitted extremities is supplemented by area contact between the end face of the plug and the shoulder of the socket, such contact also limiting the threaded interengagement of these extremities.

SUMMARY OF THE INVENTION

We realize this object, in accordance with our present invention, by providing the end face of the plug-shaped extremity of a first pipe with at least one annular rabbet centered on its axis, the shoulder of the socket-shaped extremity of a second pipe being provided with at least one annular rib receivable in that rabbet when the end face approaches the shoulder as the two coaxial pipes are interfitted and relatively rotated for mating interengagement of their helicoidal peripheral threads. The rabbet and the rib have generally complementary profiles with certain flanks parallel to the axes of the respective pipes, these parallel flanks being closely juxtaposed with each other (possibly with an intervening oil film but preferably in metal-to-metal contact) when the two extremities are relatively rotated into a terminal position of interengagement. In that terminal position, a planar top of the rib abuts a planar bottom of the rabbet to form a seal supplementing the one provided by the interacting unthreaded peripheral formations.

The rabbet on the end face of the plug, receiving the rib on the confronting shoulder of the socket, may be an annular recess radially open toward the pipe axis and have a radial width equal to that of the rib, the latter being flush with an adjoining inner wall surface of the second pipe. With the diameter of the inner wall surface of the plug—and of the first pipe integral therewith—exceeding slightly that of the second pipe and its annular shoulder in the disassembled state of the two extremities, the radial compression of the free plug end by the interaction of the unthreaded peripheral zones will eliminate this differential whereupon the rib is also flush with the inner plug surface in the terminal position. This is important from a hydraulic viewpoint when the pipes are used for the conveyance of oil or other liquids.

Alternatively, the rabbet may be a groove bounded externally and internally by respective flanges whose tops form part of the end face and in the terminal position come to rest against respective annular lands of the socket shoulder bounding its rib. In order not to interfere with the sealing action of the interacting peripheral zones and of the closely juxtaposed axially extending profile flanks, these tops and the confronting lands should have straight-line generatrices; this is contrary to a tube joint described in U.S. Pat. No. 3,870,351 according to which an end face of a male tube extremity and an inner shoulder of a female tube extremity are respectively convex and concave in axial section, with differently curved generatrices and consequent plastic deformability of these parts. In particular, the tops of the flanges and the confronting lands of the shoulder may be flat, lying in planes perpendicular to the common pipe axis; they can, however, also be shaped frustoconically, converging with a large obtuse vertex angle against the direction of insertion of the plug into the socket.

Frustoconical and planar end faces and shoulders are known per se from French Pat. Nos. 1,360,257 and 1,489,013, for example, the first of which teaches the insertion of a deformable sealing ring into a circular groove of the shoulder. Such planar terminations are also disclosed in German utility model No. 1,906,009 which further shows the unthreaded zone of the plug to be an annular bulge while that of the socket is frustoconical.

When the rabbet on the end face of the plug is a groove bounded on three sides, it may be one of several concentric grooves of substantially identical profiles coacting with as many concentric ribs—also of substantially identical profiles—on the shoulder of the socket to form a labyrinth seal. Reference in this connection may be made to a commonly owned U.S. Pat. No. 4,501,443, filed concurrently with our present application by Manfred Häring. According to the disclosure of that concurrently filed application, the end face of the plug and the shoulder of the socket have ribs and grooves defining interfitting spiral tracks instead of being concentric about the common pipe axis.

BRIEF DESCRIPTION OF THE DRAWING

The above and other features of our invention will now be described in detail with reference to the accompanying drawing in which.

SPECIFIC DESCRIPTION

Figure 1:
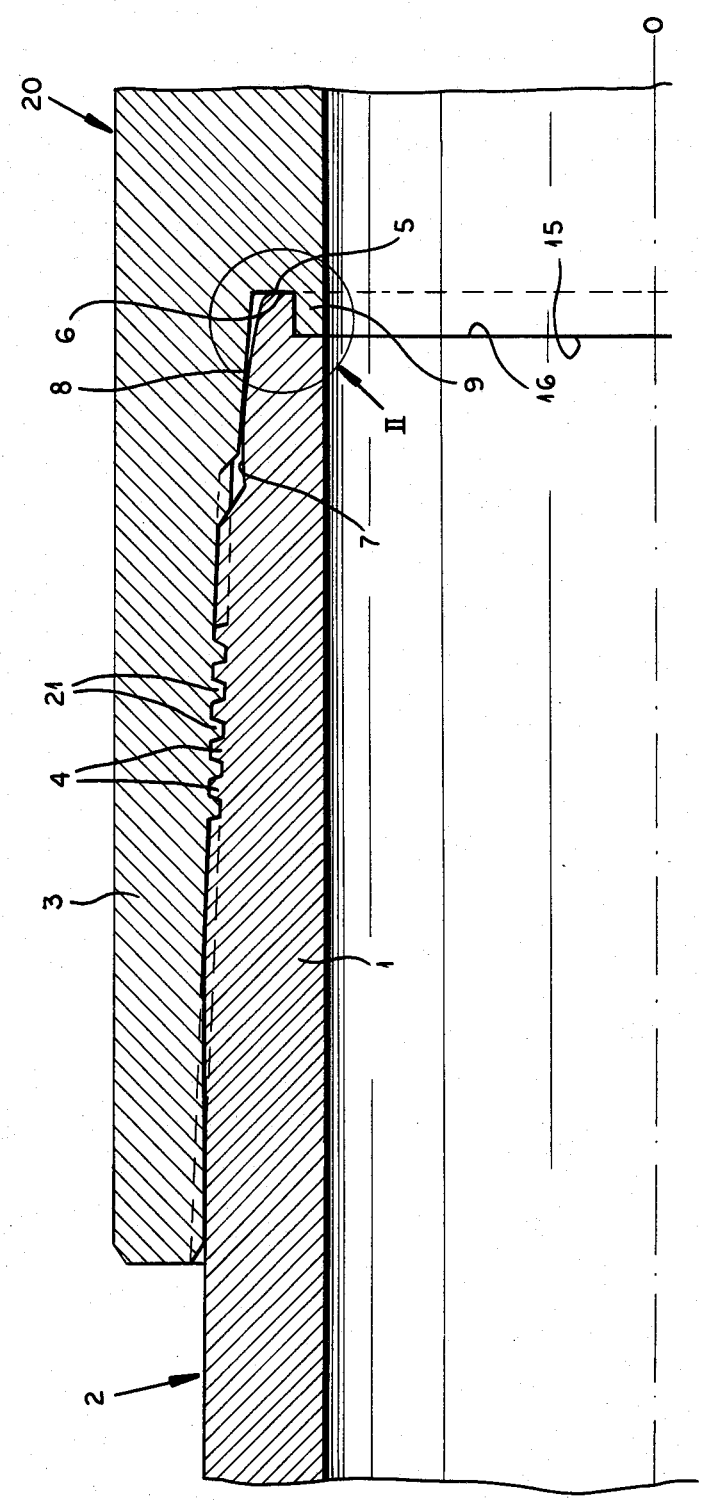
FIG. 1 is a longitudinal sectional view of interfitted male and female extremities of respective metallic pipes in accordance with our present invention.
Figure 2:
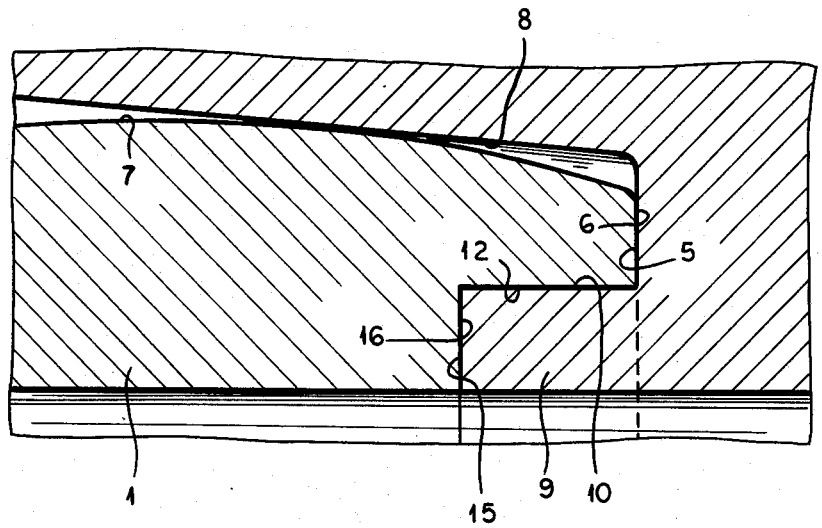
FIG. 2 is an enlarged sectional view of a detail marked by a circle II in FIG. 1.
Figure 3:
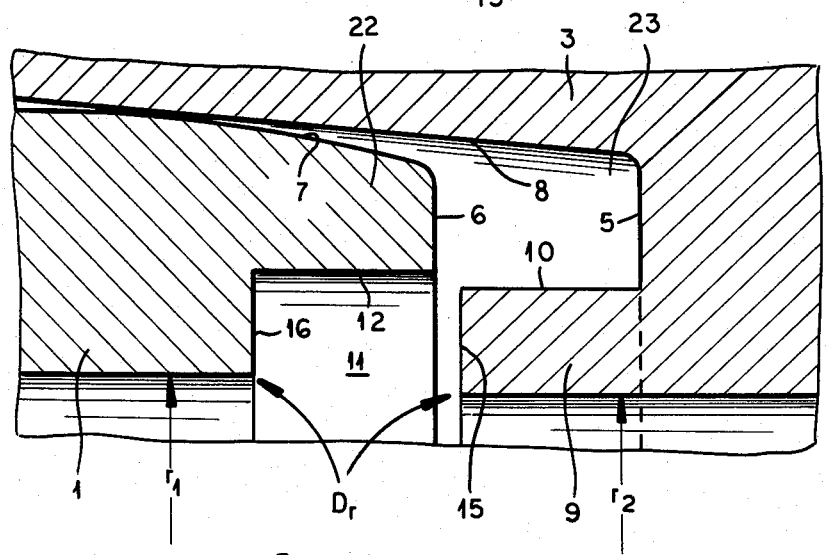
FIG. 3 is a view similar to FIG. 2, showing the two pipe extrimites in a position preceding the last phase of assembly.

FIGS. 1–3 show interfitted extremities of two coaxial pipes illustrated only in part, namely a plug 1 at an end of a pipe 2 and a socket 3 at an end of a pipe 20. Plug 1 has a generally frustoconical outer peripheral surface with male helicoidal threads 4 matingly engaging female helicoidal threads 21 on a generally frustoconical inner peripheral surface of socket 3. Plug 1 terminates in a transverse annular end face 6 which, in the assembled position of FIGS. 1 and 2, abuts an annular shoulder 5 of socket 3. Shoulder 5 is separated from threads 21 by an unthreaded frustoconical peripheral zone 8 which is in close contact with an unthreaded annular bulge 7 lying between threads 4 and end face 6 of plug 1. The radial width of the two annular lands 5, 6, which may be approximately 5 mm, has been greatly exaggerated in FIGS. 2 and 3 for the sake of clarity. Zone 8 could also be slightly curved in axial section.

In accordance with our present invention, as embodied in the structure of FIGS. 1–3, shoulder 5 is formed integral with an annular rib 9 of rectangular cross-section receivable in a rabbet 11 of end face 6 having the same cross-section, with a radial width ranging between about one half and one third of the thickness of the plug in the vicinity of bulge 7. Prior to final assembly, as seen in FIG. 3, the inner peripheral surface of rib 9 flush with the inner wall surface of pipe 20 has a radius $r_2$ slightly less than the radius $r_1$ of the inner wall surface of plug 1 and pipe 2. The radial differential $D_r$ corresponds to an initial offset between an outer flank 10 of the rectangular profile of rib 9 and a corresponding flank 12 of the profile of groove 11, both these flanks being parallel to the common pipe axis O (FIG. 1) and perpendicular to the planes of annular lands 5 and 6. Upon relative rotation of the partly interfitted extremities 1 and 3, their mating threads 4 and 21 draw them into the terminal position of FIG. 2 in which the interaction of bulge 7 with frustoconical zone 8 radially compresses the free end of plug 1 whereby the differential $D_r$ is eliminated and groove flank 12 comes to rest on rib flank 10. At the same time, as shown in FIG. 2, a preferably flat top 15 of rib 9 abuts a preferably flat bottom 16 of rabbet 11 while the top of an annular flange 22 externally bounding the rabbet 11, which forms part of the transverse end face 6, abuts the shoulder 5 which is seen to constitute the flat bottom of an annular groove 23 surrounding the rib 9. In the terminal position of FIGS. 1 and 2, therefore a multiple seal exists along annular areas defined by formations 5 and 6, 7 and 8, 10 and 12 as well as 15 and 16. In principle, it is not absolutely necessary that a metal-to-metal contact be provided at each of these areas; thus, the outer rib boundary 10 and the outer rabbet boundary 12 could be separated by a narrow gap, allowing for resilient interplay, while a minor separation may also exist between confronting planar surfaces 5 and 6 or 15 and 16. With proper dimensioning of the rib and the rabbet, however, metal-to-metal contact could be obtained at all four locations. Rib 9 could also be of substantially square cross-section. The interfitting formations 9 and 11 can be relatively easily machined.

Figure 4:
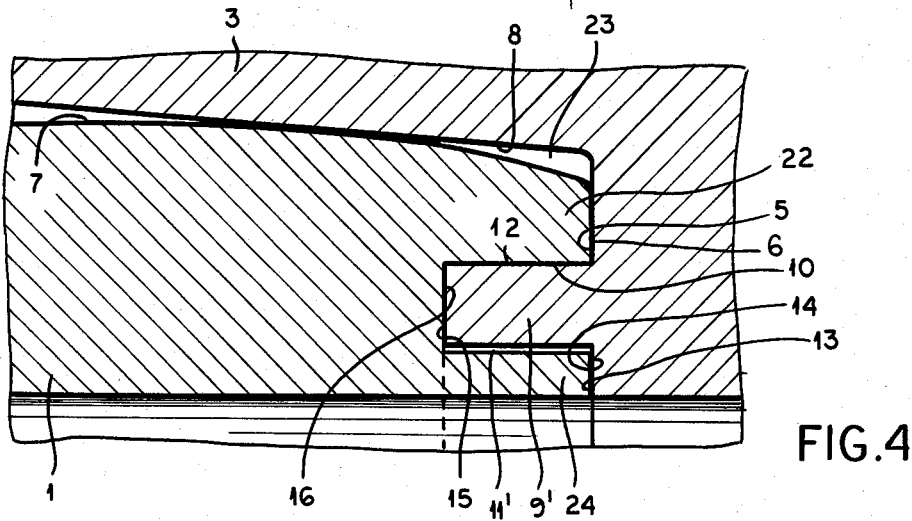
FIG. 4 is another view similar to FIG. 2, illustrating a modification.

In FIG. 4 we have illustrated a modification of the assembly of FIGS. 1–3 in which the rib 9 has been replaced by a narrower rib 9', still of rectangular profile, radially separated by an annular land 13 from the inner wall surface of socket 3. Rib 9' is received in a groove 11' of end face 6 which is internally bounded by an annular flange 24 flush with the inner wall surface of plug 1. Groove 11', also of rectangular profile, is slightly wider than rib 9' to facilitate their interengagement, bearing in mind the radial differential $D_r$ existing just prior to the final phase of assembly. Land 13, which lies in the transverse plane of shoulder 5, abuts the flat top 14 of flange 24 even as the top of flange 22 comes to rest against the bottom of groove 23. This groove bottom, however, need not be coplanar with land 13; thus, flanges or ribs 22 and 24 may differ from each other in axial height.

Figure 5:
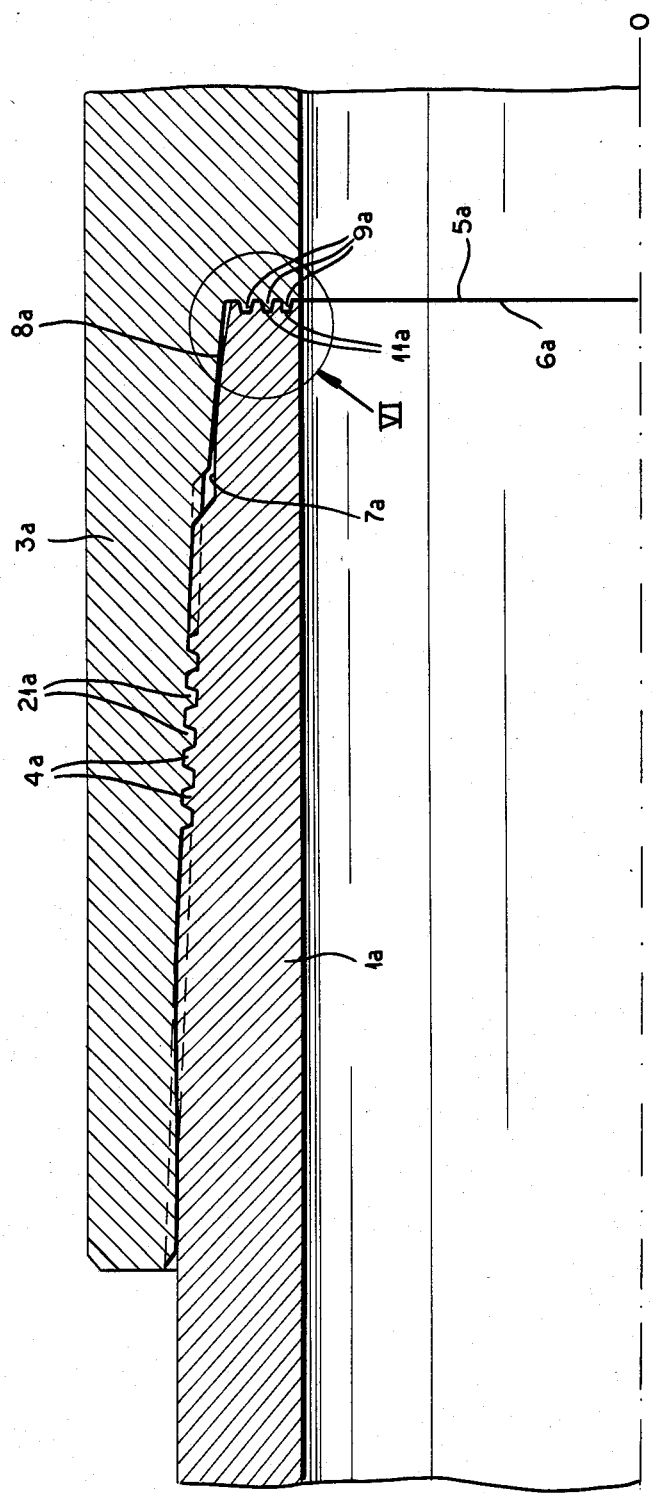
FIG. 5 is a longitudinal sectional view similar to that of FIG. 1, illustrating another embodiment.
Figure 6:
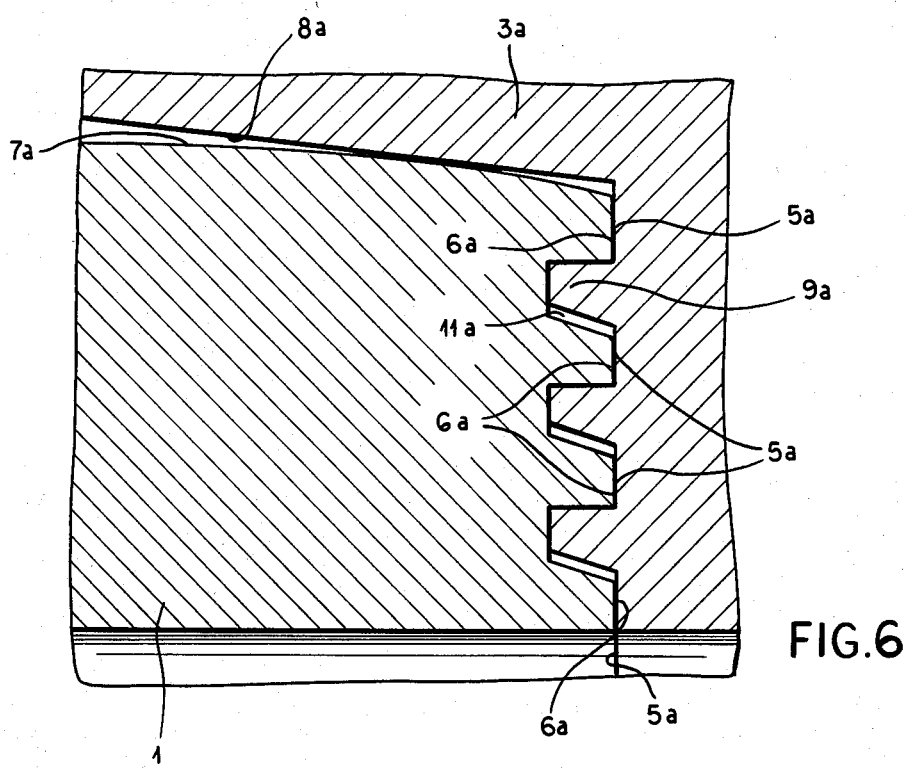
FIG. 6 is an enlarged sectional view of a detail marked by a circle VI in FIG. 5.
Figure 7:
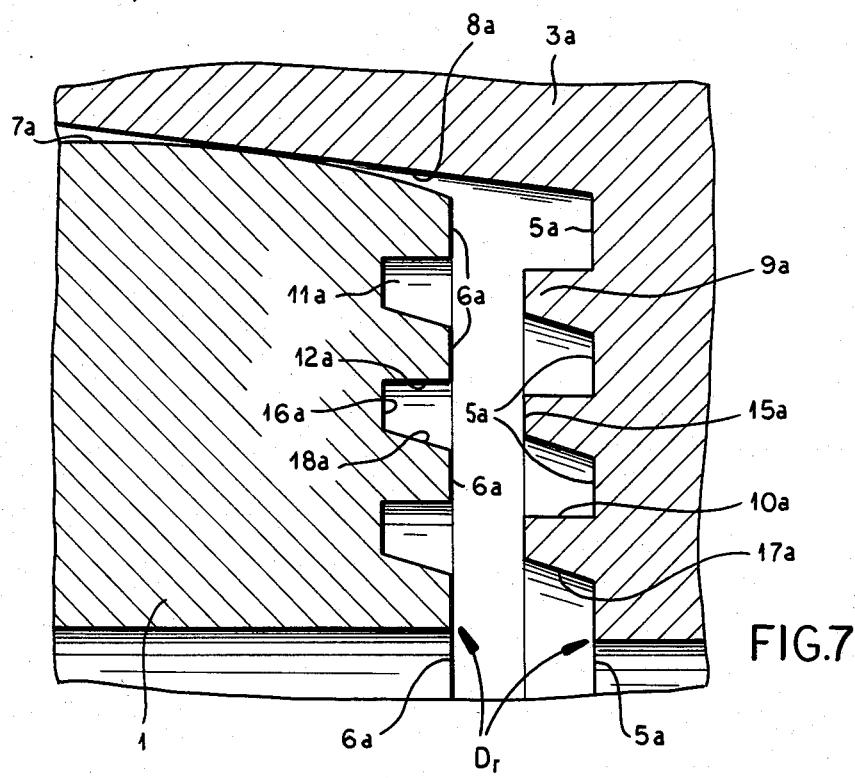
FIG. 7 is a view similar to FIG. 6, showing the pipe extremities in a position preceding the last phase of assembly.

FIGS. 5–7 show an assembly, generally similar to that of the preceding Figures, comprising two interfitted pipe extremities 1a, 3a with interengaging peripheral threads 4a, 21a; an unthreaded peripheral bulge 7a of plug 1a coacts with a frustoconical peripheral zone 8a of socket 3a in the assembled position to exert radial pressure upon the free end of plug 1a whereby a radial differential $D_r$ between the inner wall surfaces of the two pipe extremities is eliminated, as discussed above. An annular shoulder 5a of socket 3a is here provided with several concentric annular ribs 9a, of trapezoidal profile, fitting into similarly profiled concentric annular rabbets or grooves 11a of an end face 6a of plug 1a. In a manner analogous to that heretofore described, the profile of each rib 9a has an axially extending outer flank 10a closely approached and preferably contacted by a corresponding flank 12a of the profile of the respective groove 11a. Flat tops 15a of ribs 9a, lying in a plane perpendicular to pipe axis O, contact the equally flat bottoms 16a of grooves 11a in the terminal position of FIGS. 5 and 6. At the same time, the tops of annular flanges or ribs bounding the grooves 11a—which lie in the transverse plane of end face 6a—come into contact with the bottoms of grooves separating the ribs 9a in the transverse plane of shoulder 5a. The sloping inner flanks 17a of the trapezoidal rib profiles are separated from the corresponding groove flanks 18a, in that terminal position, by small clearances facilitating the introduction of the ribs into the grooves when the plug 1a is being screwed into the socket 3a.

Figure 8:
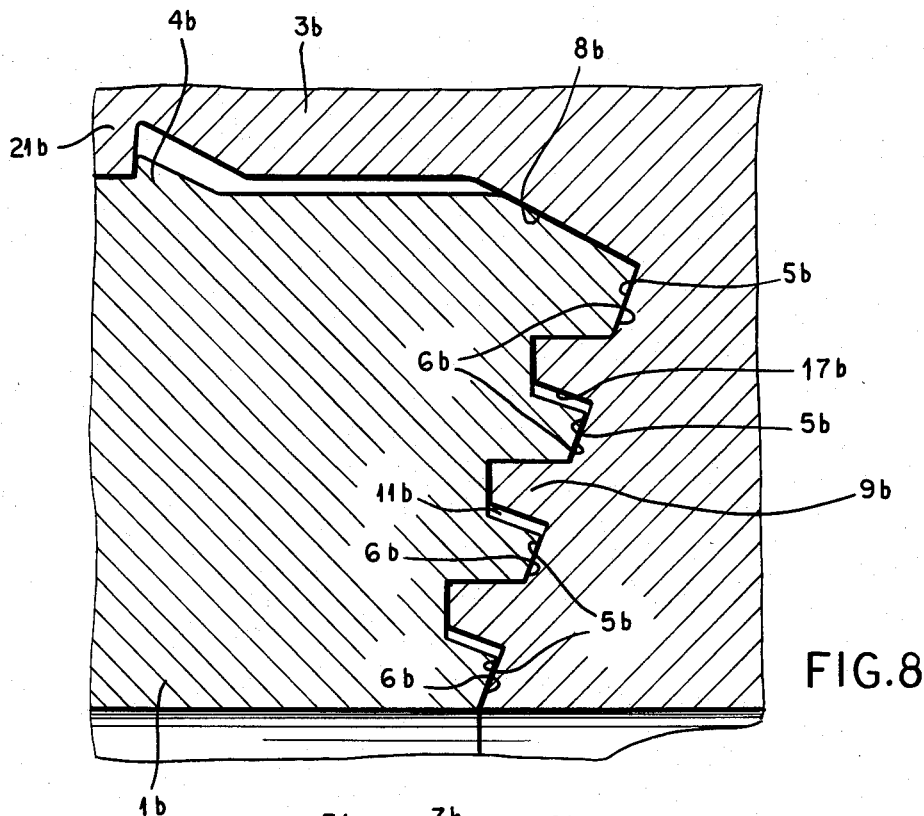
FIGS. 8 and 9 show views similar to FIGS. 6 and 7, relating to a further embodiment.
Figure 9:
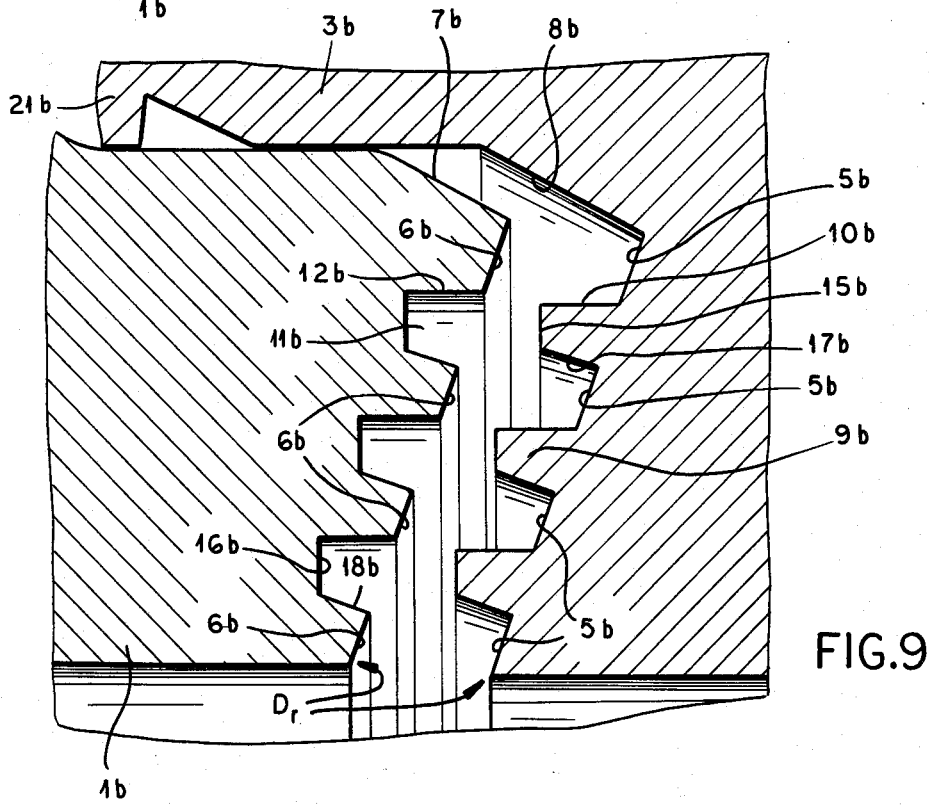

As illustrated in FIGS. 8 and 9, extremities 1b and 3b with helicoidal threads 4b, 21b have an end face 6b and a shoulder 5b in the shape of wide-angle frustocones which are respectively concave and convex so that their generatrices converge in a direction opposite that of insertion, namely toward the left as viewed in these Figures. Ribs 9b projecting from shoulder 5b and grooves 11b recessed into end face 6b are similar to those of the preceding embodiment, with planar tops and bottoms perpendicular to the pipe axis, outer profile flanks 10b and 12b parallel to that axis, and sloping inner profile flanks 17b and 18b slightly spaced apart in the assembled position of FIG. 8. The radial compression of the free plug end, designed to eliminate the offset $D_r$, is here accomplished by two frustoconical zones 7b and 8b of plug 1b and socket 3b which in the final phase of assembly come into metal-to-metal contact with each other. The generatrices of the convex and concave zones 7b and 8b converge in the direction of insertion, i.e. to the right as viewed in FIGS. 8 and 9, with a relatively small vertex angle.

Figure 10:
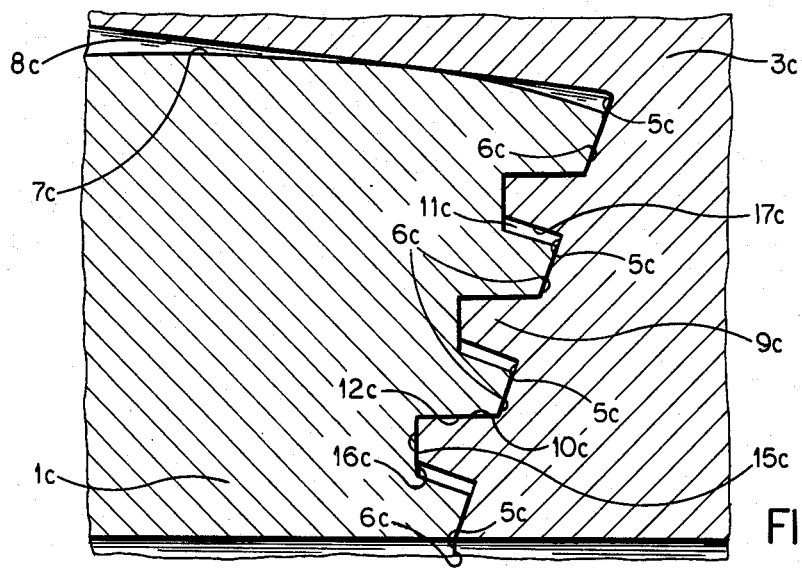
FIGS. 10–12 are views similar to FIG. 8, illustrating additional modifications.

As illustrated in FIG. 10, where elements corresponding to those of the preceding Figures have been designated by the same reference numerals with suffix c, the coacting peripheral zones of extremities 1c and 3c are in the form of a bulge 7c and a frustocone 8c similar to corresponding formations of FIGS. 1–7. The structure and mode of operation are otherwise the same as in the preceding embodiments.

Figure 11:
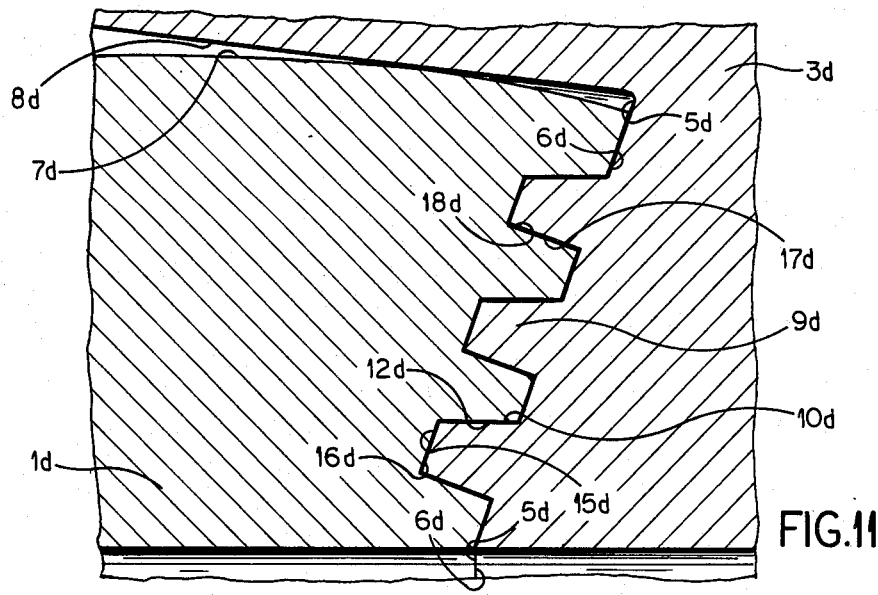

In FIG. 11, where the suffix c of FIG. 10 has been replaced by a d, extremities 1d and 3d differ from those of FIG. 10 only in the profiles of the ribs 9d and of the corresponding grooves, with the rib tops and the groove bottoms now lying in the assembled position on a frustoconical surface of the same large obtuse vertex angle as shoulder 5d and end face 6d. FIG. 11 also shows that the clearance between the sloping flanks 17d and 18d of the rib and groove profiles can be eliminated upon final assembly, provided of course that these profiles are precisely machined for exact interfitting. The same applies to the embodiments of FIGS. 5–10. It is also possible, with the arrangement of FIG. 11 and corresponding modifications of the preceding embodiments, to leave a small clearance between the axially extending profile flanks 10a–10d and 12a–12d when the sloping flanks are thus pressed into contact in the terminal position. The annular rib and groove edges may, of course, be somewhat rounded in all instances.

Figure 12:
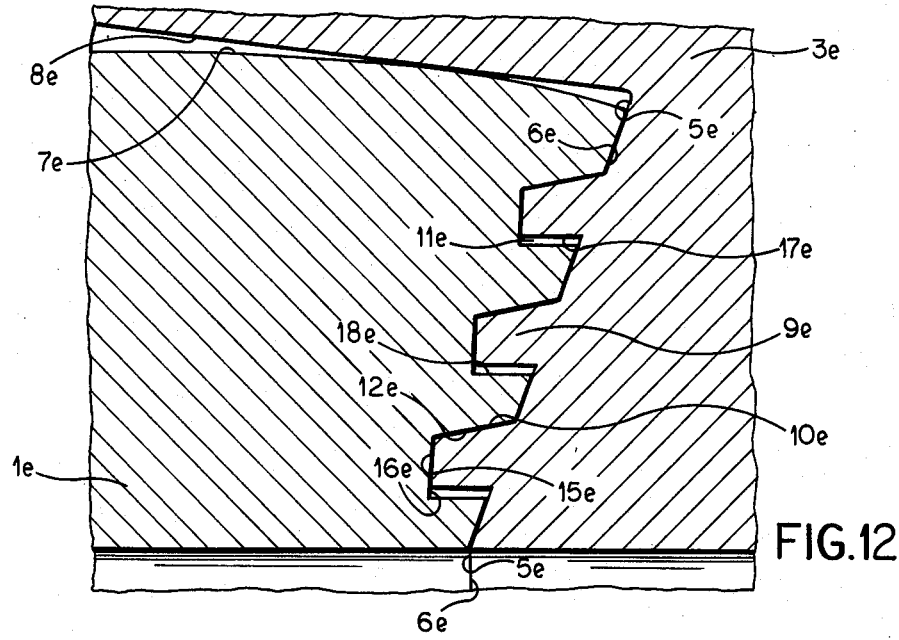

In the embodiments of FIGS. 5–11, in which the profiles of the ribs and grooves have diverging lateral flanks, the outer flanks are parallel to the pipe axis and resist radial compression of the plug end by the peripheral formations 7a–7d and 8a–8d. The shape of the profiles could, however, be inverted to make their inner flanks parallel to the axis, with their outer flanks sloping toward the axis in a direction opposite that of insertion. In the latter instance the interaction of these sloping flanks, in the finae stage of assembly, will tend to expand the plug end radially, thereby countering the compressive effect of the peripheral formations. This has been illustrated in FIG. 12 where elements corresponding to those of the preceding Figures have been designated by the same references followed by the suffix e; the clearances between inner flanks 17e and 18e could be eliminated in some instances.

While tubular members 2 and 20 (FIG. 1) may both be full-length pipe sections with male and/or female extremities on opposite ends, pipe 20 could be reduced to a short sleeve with oppositely pointing sockets separated by a narrow annular shoulder as shown in the aforementioned German utility model No. 1,906,009.

We claim:
1. A pipe joint comprising:
   a male metallic tubular member having a cylindrical bore and a plug-shaped first extremity formed with an annular rabbet along said bore and opening at an end face of said first extremity;
   said rabbet being delimited at least by a cylindrical surface of a diameter greater than that of said bore and an inner surface lying in a plane perpendicular to an axis of said member,
   said end face lying in a plane perpendicular to said axis,
   said first extremity having an outwardly bowed convex outer surface extending axially rearwardly from said end face and of a diameter increasing away from said end face, and
   a male helicoidal thread formed on said first extremity and spaced axially rearwardly from said outer surface of said first extremity; and
   a female metallic tubular member having a cylindrical bore and a socket-shaped second extremity coaxially receiving said first extremity,
   said second extremity being formed with an annular rib surrounding said bore of said second extremity,
   said bore of said second extremity being flush with the bore of said first extremity of said inner surface of said first extremity,
   said second extremity being formed by a recessed annular face lying in a plane perpendicular to said axis and sealingly abutted by said end face of said first extremity,
   said rib having an end surface adapted to sealingly abut said inner surface of said rabbet and a cylindrical surface adapted to be sealingly surrounded by said cylindrical surface of said rabbet,
   a frustoconical surface diverging outwardly from said recessed face on said second extremity and tangentially engaging said outwardly bowed surface of said first extremity for forcing said cylindrical surface of said rabbet against said cylindrical surface of said rib, and
   said second extremity being formed with a female helicoidal thread extending away from said frustoconical surface and engageable with said male thread upon the thread coupling of said members to effect sealing contact of said frustoconical surface with said bowed surface, of said cylindrical surfaces with each other, of said end surface of said rib with said inner surface of said rabbet, and of said end face of said first extremity with said recessed face of said second extremity.

* * * * *